US008429004B2

(12) United States Patent
Hamilton et al.

(10) Patent No.: US 8,429,004 B2
(45) Date of Patent: Apr. 23, 2013

(54) METHOD AND SYSTEM FOR AUTOMATICALLY MEASURING RETAIL STORE DISPLAY COMPLIANCE

(75) Inventors: Craig Hamilton, Nashville, TN (US); Wayne Spencer, Charlestown, MA (US); Alexander Ring, Allentown, PA (US)

(73) Assignee: Store Eyes, Inc., Sherman Oaks, CA (US)

( * ) Notice: Subject to any disclaimer, the term of this patent is extended or adjusted under 35 U.S.C. 154(b) by 1408 days.

(21) Appl. No.: 11/887,599

(22) PCT Filed: Apr. 12, 2006

(86) PCT No.: PCT/US2006/013703
§ 371 (c)(1),
(2), (4) Date: Oct. 1, 2007

(87) PCT Pub. No.: WO2006/113281
PCT Pub. Date: Oct. 26, 2006

(65) Prior Publication Data
US 2008/0306787 A1    Dec. 11, 2008

Related U.S. Application Data

(60) Provisional application No. 60/670,802, filed on Apr. 13, 2005.

(51) Int. Cl.
*G06Q 10/00* (2006.01)
(52) U.S. Cl.
USPC ..................... 705/7.41; 705/7.38; 705/7.11
(58) Field of Classification Search ............... 705/7.41
See application file for complete search history.

(56) References Cited

U.S. PATENT DOCUMENTS

| 6,347,144 | B1 * | 2/2002 | Park ............................. 380/201 |
| 6,584,375 | B2 * | 6/2003 | Bancroft et al. .............. 700/213 |
| 7,206,753 | B2 * | 4/2007 | Bancroft et al. ................ 705/10 |
| 7,233,241 | B2 * | 6/2007 | Overhultz et al. ......... 340/539.2 |
| 7,356,495 | B2 * | 4/2008 | Beigl et al. ....................... 705/28 |
| 7,374,096 | B2 * | 5/2008 | Overhultz et al. ............. 235/487 |
| 7,510,123 | B2 * | 3/2009 | Overhultz et al. ............. 235/492 |
| 7,535,337 | B2 * | 5/2009 | Overhultz et al. ............ 340/5.91 |
| 7,584,016 | B2 * | 9/2009 | Weaver ......................... 700/213 |
| 2002/0138374 | A1 * | 9/2002 | Jennings et al. ................ 705/29 |

(Continued)

FOREIGN PATENT DOCUMENTS
WO    WO 2005079338 A2 *    9/2005

*Primary Examiner* — Jacob C. Coppola
(74) *Attorney, Agent, or Firm* — Cooper & Dunham LLP

(57) ABSTRACT

Methods and systems for measuring retail store display compliance are provided. One or more images of one or more retail store conditions are captured and associated with related information. The one or more captured images and the related information are transmitted to a processing location for storage and processing. The one or more captured images and the related information are received at the processing location, stored in a repository and processed. The one or more retail store conditions in the one or more captured images are compared with a library to identify them and obtain identification information. The one or more identified captured images and identification information for the one or more retail store conditions are stored in the repository. The one or more retail store conditions in the one or more captured images and identification information are analyzed and one or more summary reports or one or more alerts are generated based upon the analysis.

12 Claims, 14 Drawing Sheets

U.S. PATENT DOCUMENTS

| | | | |
|---|---|---|---|
| 2002/0165638 A1* | 11/2002 | Bancroft et al. | 700/213 |
| 2003/0036985 A1* | 2/2003 | Soderholm | 705/28 |
| 2003/0097302 A1* | 5/2003 | Overhultz et al. | 705/14 |
| 2003/0133614 A1* | 7/2003 | Robins et al. | 382/219 |
| 2003/0154141 A1* | 8/2003 | Capazario et al. | 705/27 |
| 2003/0222762 A1* | 12/2003 | Beigl et al. | 340/5.92 |
| 2004/0056091 A1 | 3/2004 | Overhultz et al. | |
| 2004/0208372 A1* | 10/2004 | Boncyk et al. | 382/181 |
| 2005/0055223 A1* | 3/2005 | Khosla | 705/1 |
| 2005/0131578 A1* | 6/2005 | Weaver | 700/244 |
| 2006/0010199 A1* | 1/2006 | Brailean et al. | 709/204 |
| 2006/0015408 A1* | 1/2006 | Brown | 705/22 |
| 2006/0109125 A1* | 5/2006 | Overhultz et al. | 340/572.1 |
| 2006/0147087 A1* | 7/2006 | Goncalves et al. | 382/103 |
| 2006/0163349 A1* | 7/2006 | Neugebauer | 235/383 |
| 2006/0164247 A1* | 7/2006 | Overhultz et al. | 340/572.1 |
| 2006/0178024 A1* | 8/2006 | Overhultz et al. | 439/83 |
| 2006/0243798 A1* | 11/2006 | Kundu et al. | 235/383 |
| 2007/0035380 A1* | 2/2007 | Overhultz et al. | 340/5.9 |
| 2007/0220540 A1* | 9/2007 | Walker et al. | 725/14 |
| 2007/0260429 A1* | 11/2007 | Vera et al. | 702/188 |
| 2008/0306787 A1* | 12/2008 | Hamilton et al. | 705/7 |
| 2010/0171826 A1* | 7/2010 | Hamilton et al. | 348/135 |

* cited by examiner

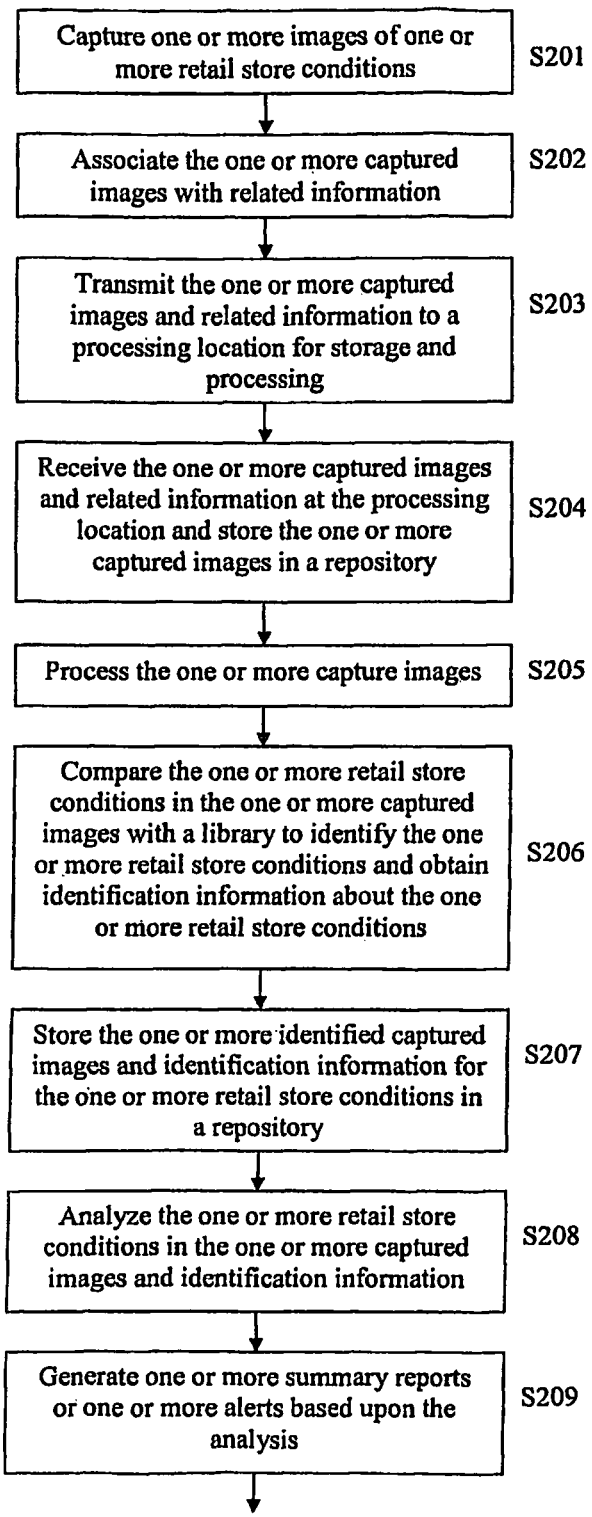

FIGURE 4

Main Screen 40

| # | Location | Status |
|---|----------|--------|
| 1. | Produce | Done |
| 2. | Aisle 1 | Done |
| 3. | End-cap 1 | Done |
| 4. | Aisle 2 | To be done |
| 5. | Aisle 3 | To be done |
| 6. | Aisle 4 | To be done |
| 7. | Aisle 5 | To be done |
| 8. | Aisle 6 | To be done |
| 9. | Aisle 7 | To be done |
| 10. | Aisle 8 | To be done |
| 11. | Aisle 9 | To be done |
| 12. | Aisle 10 | To be done |
| 13. | Aisle 11 | To be done |
| 14. | Aisle 12 | To be done |
| 15. | Freezer-dairy | To be done |
| 16. | Freezer-other | To be done |

Floor Plan 47

This area will display helpful messages and instructions.

Message Board 48

| 41 | 42 | 43 | | 44 | 45 | 46 |
|---|---|---|---|---|---|---|
| Login/Logout | Go to Detail Screen | Check Battery | | Store Notes | Up-load Pics | Help |

Retailer Display Recap

| | |
|---|---|
| Planned Displays | 1000 |
| Actual | 650 |
| Compliance | 65% |
| Goal | 90% |

Item Display Recap

| Item | Stores | Compliance |
|---|---|---|
| Dog Chow 22lb | 900 | 90% |
| Beggin Strips Shipper | 350 | 35% |
| Purina ONE | 200 | 20% |

Display Picture

FIGURE 8

Store Level Report - 508

Display Compliance Report

Sales Plan Items NOT on Display
Brand A 8oz
Brand B 36 ct
Brand C 48oz
*Brand Family Groups?* from product library database?

| Display Items not on Sales Plan | Days on Display | Display Type | Location |
|---|---|---|---|
| PL Towels 100ct | 15 | Wing | Rear |
| PL Sugar 5lb | 35 | End | Front |
| Pepper | 165 | Shipper | Front |

| | |
|---|---|
| Total Items not on display | 3 |
| Compliance Ratio (Total Displays/Sales Plan Displays) | 85% |
| Monthly Compliance Ratio | 80% |
| YTD Compliance Ratio | 70% |

Databases - Retailer Master, product image library for Brand groups, Sales Plan Input
Sorted column by brand Not on display items
Display items not on sales plan soted ascending by days on display Drops off report after XXX days on display
Recap compliance running total by month and by YTD New Items Report recap
Planogram

FIGURE 9

District Level Report - A

Display Compliance Report

| Sales Plan Items NOT on Display | Number of stores not on display | Stores not on Display | | | |
|---|---|---|---|---|---|
| Brand A 8oz | 4 | 508 | 519 | 201 | 339 |
| Brand B 36 ct | 3 | 508 | 354 | 201 | |
| Brand C 48oz | 2 | 508 | 543 | | |

*Brand Family Groups?* from product library database?

Display Items not on Sales Plan
Store 508    15
Store 519    12
Store 201    7

Total Items not on display                              33
Compliance Ratio (Total Displays/Sales Plan Displays)   85%
Monthly Compliance Ratio                                80%
YTD Compliance Ratio                                    85%

Databases - Retailer Master, product image library for Brand groups, Sales Plan input
Sorted column by brand by stores not on display, rows by retailer district by stores not on display
Recap total non compliance stores by retailer by district
Recap running total by month and by YTD

FIGURE 10

Division Level Report - 024 Mid South

Display Compliance Report

| Sales Plan Items NOT on Display | Number of stores not on display | Districts | | | |
|---|---|---|---|---|---|
| Brand A 8oz | | 4 B | A | C | D |
| Brand B 36 ct | | 3 B | A | C | |
| Brand C 48oz | | 2 B | A | | |

*Brand Family Groups?" from product library database?

Display Items not on Sales Plan

| | |
|---|---|
| Zone B | 16 |
| Zone A | 12 |
| Zone C | 7 |

| | |
|---|---|
| Total Items not on display | 33 |
| Compliance Ratio (Total Displays/Sales Plan Displays) | 85% |
| Monthly Compliance Ratio | 80% |
| YTD Compliance Ratio | 85% |

Databases - Retailer Master, product image library for Brand groups, Sales Plan Input
Sorted column by brand by stores not on display, rows by retailer district by stores not on display
Recap total non compliance stores by retailer by district
Recap running total by month and by YTD

FIGURE 11

Retailer Level Report - 001 I

Display Compliance Report

| Sales Plan Items NOT on Display | Number of stores not on display | Div 024 | Div 025 | Div 026 | Div 028 |
|---|---|---|---|---|---|
| Brand A 8oz | 100 | 50 | 25 | 15 | 10 |
| Brand B 36 ct | 50 | 40 | 5 | 5 | |
| Brand C 48oz | 25 | 15 | 5 | 5 | |

*Brand Family Groups?* from product library database?

| | | | | | |
|---|---|---|---|---|---|
| Total non compliance stores | 175 | 105 | 35 | 25 | 10 |
| Compliance Ratio (Total store displays stores not on display) | 85% | 85% | 80% | 75% | 45% |
| Monthly Compliance Ratio | 80% | 80% | 70% | 85% | 55% |
| YTD Compliance Ratio | 85% | 85% | 90% | 90% | 60% |

Databases - Retailer Master, product image library for Brand groups Sales Plan Input
Sorted column by brand by stores not on display, rows by retailer division by stores not on display
Recap total non compliance stores by retailer by division
Recap running total by month and by YTD

FIGURE 12

Brand Report Brand B 36ct

Display Compliance Report

|  | Number of store displays | Display Penetration | Competitive Brands | | | |
|---|---|---|---|---|---|---|
| Customer | | | Brand E | Display Penetration | Brand F | Display Penetration |
| Total | 5000 | 70% | 857 | 20% | 90 | 20% |
| A | 2000 | 80% | 500 | 15% | 50 | 5% |
| B | 1500 | 75% | 200 | 20% | 25 | 3% |
| C | 1000 | 70% | 125 | 15% | 10 | 2% |
| D | 500 | 40% | 32 | 10% | 5 | 1% |

|  | Display Days | Share of display |
|---|---|---|
| Category | 1500 | |
| Brand B | 1000 | 66.7% |
| Brand C | 750 | 50.0% |
| Brand D | 300 | 20.0% |

Database - Store collection, Brand Input, Retailer Master
Sorted by Retailer stores o display Category Display Recap - Display Day = 1 store 1 brand 1 day
Category defined by product image library database
Share computed - Total category display days divided by brand display days

METHOD AND SYSTEM FOR AUTOMATICALLY MEASURING RETAIL STORE DISPLAY COMPLIANCE

REFERENCE TO RELATED APPLICATIONS

The present disclosure is based on and claims the benefit of Provisional Application 60/670,802 filed Apr. 13, 2005, entitled "Method And System For Automatically Measuring Retail Store Display Compliance", the entire contents of which are herein incorporated by reference.

BACKGROUND

1. Field of the Invention

The present disclosure relates generally to the field of consumer product sales and, more particularly, to a method and system for measuring retail store display compliance through automated, digital image capture and analysis.

2. Background of the Invention

Sales of consumer products have been shown to increase dramatically with the use of large displays set up in secondary locations in high traffic areas of a retail store in comparison with sales of the same product sold directly from their primary shelf location. As a result, manufacturers spend billions of dollars annually purchasing display space in retail stores in the form of, for example, end-of-aisle displays, stand-alone displays, point-of-sale displays, pallet displays, etc. In some instances, manufacturers may pay retailers a fee for the prime placement of products in grocery stores or supermarkets for specified periods of time to facilitate the products sale, for example, shelves at eye level or at end-of-aisle displays.

To ensure that the retailer is adequately showcasing its product and display, a manufacturer typically sends its personnel or an independent auditor to visit the retail location. The auditor verifies whether or not the display has been set up in a manner satisfactory to and paid for by the manufacturer. However, the problem with such audits is that they normally are done on a sample basis, usually less than 10% of the total market. The frequency of the audits is very limited, no more than once a week. For example, it is expensive and difficult to regularly inspect hundreds of chains of retail stores, especially if they are located all over the country. Results are then projected for a chain or market based on this small sample. Because items in grocery stores, for example, have a high rate of turns, displays change from day to day, which makes the current method of reporting not a fair representation of the actual store conditions.

Manufacturers often find themselves paying billions of dollars for retail display space with no adequate way to ensure that retail stores are in fact merchandising their promoted products in the location and for the amounts of time for which payment has been made. Accordingly, there is a need for a reliable and efficient way to audit retail store display compliance.

SUMMARY

A method for measuring retail store display compliance, according to one embodiment of the present invention, includes, capturing one or more images of one or more retail store conditions, associating the one or more captured images with related information, transmitting the one or more captured images and the related information to a processing location for storage and processing, receiving the one or more captured images and the related information at the processing location and storing the one or more captured images and related information in a repository, processing the one or more captured images, comparing the one or more retail store conditions in the one or more captured images with a library to identify the one or more retail store conditions and obtain identification information about the one or more retail store conditions, storing the one or more identified captured images and identification information for the one or more retail store conditions in the repository, analyzing the one or more retail store conditions in the one or more captured images and identification information, and generating one or more summary reports or one or more alerts based upon the analysis.

A system for measuring retail store display compliance, according to one embodiment of the present invention, includes, an image capture unit for capturing one or more images of one or more retail store conditions, means for associating the one or more captured images with related information, means for transmitting the one or more captured images and the related information; and a processing location including means for receiving the one or more captured images and related information, means for processing the one or more captured images, an image recognition module for comparing the one or more retail store conditions in the one or more captured images with a library to identify the one or more retail store conditions and obtain identification information about the one or more retail store conditions, a repository for storing the one or more identified captured images and identification information; and a reporting engine for analyzing the one or more retail store conditions in the one or more captured images and identification information and generating one or more summary reports or one or more alerts based upon the analysis.

A computer storage medium, including computer executable code for measuring retail store display compliance, according to one embodiment of the present invention, includes, code for capturing one or more images of one or more retail store conditions, code for associating the one or more captured images with related information, code for transmitting the one or more captured images and the related information to a processing location for storage and processing, code for receiving the one or more captured images and the related information at the processing location and storing the one or more captured images and related information in a repository, code for processing the one or more captured images, code for comparing the one or more retail store conditions in the one or more captured images with a library to identify the one or more retail store conditions and obtain identification information about the one or more retail store conditions, code for storing the one or more identified captured images and identification information for the one or more retail store conditions in the repository, code for analyzing the one or more retail store conditions in the one or more captured images and identification information, and code for generating one or more summary reports or one or more alerts based upon the analysis.

A computer storage medium, including computer executable code for measuring retail store display compliance, according to one embodiment of the present invention, includes, code for identifying and verifying the location of the apparatus, code for capturing one or more images of one or more retail store conditions, code for storing the one or more captured images of the one or more retail store conditions, code for processing the one or more captured images of the one or more retail store conditions, code for transmitting the one or more captured images of the one or more retail store conditions to a processing location, and code for generating a confirmation indicating whether the one or more captured images of the one or more retail store conditions were successfully sent to the processing location.

BRIEF DESCRIPTION OF THE DRAWINGS

The features of the present application can be more readily understood from the following detailed description with reference to the accompanying drawings wherein:

FIG. 2B is a flow chart illustrating a method for measuring retail store display compliance, according to one embodiment of the present invention;

FIG. 4 is a block diagram illustrating the main screen of the mobile capture unit, according to one embodiment of the present disclosure;

FIG. 8 is a sample report showing display compliance by store generated by using the method for measuring retail store display compliance, according to one embodiment of the present invention;

FIG. 9 is a sample report showing display compliance at the district level, generated by using the method for measuring retail store display compliance, according to one embodiment of the present invention;

FIG. 10 is a sample report showing display compliance at the division level, generated by using the method for measuring retail store display compliance, according to one embodiment of the present invention;

FIG. 11 is a sample report showing display compliance at a retailer level, generated by using the method for measuring retail store display compliance, according to one embodiment of the present invention; and FIG. 12 is a sample report showing display compliance by competitive brand, generated by using the method for measuring retail store display compliance, according to one embodiment of the present invention.

DETAILED DESCRIPTION OF THE PREFERRED EMBODIMENTS

Figure 1:
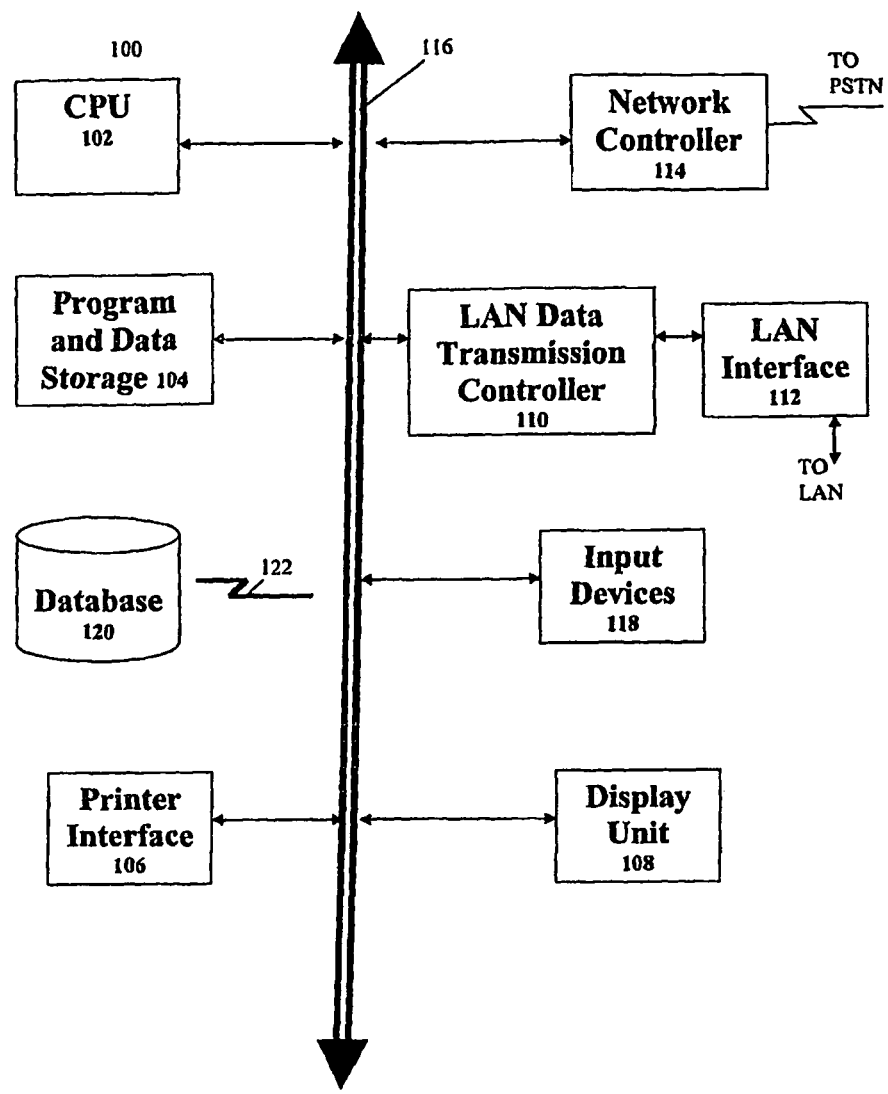
FIG. 1 is a block diagram of an exemplary computer system capable of implementing the method and system of the present invention.

The present invention provides tools (in the form of methodologies and systems) for measuring retail store display compliance through automated, digital image capture and analysis. FIG. 1 shows an example of a computer system 100 which may implement the method and system of the present invention. The system and method of the present invention may be implemented in the form of a software application running on a computer system, for example, a mainframe, personal computer (PC), handheld computer or server. The software application may be stored on a recording medium locally accessible by the computer system, for example, floppy disk, compact disk, or hard disk, or may be remote from the computer system and accessible via a hard wired or wireless connection to a network (for example, a local area network, or the Internet) or another transmission medium.

The computer system 100 can include a central processing unit (CPU) 102, program and data storage devices 104, a printer interface 106, a display unit 108, a (LAN) local area network data transmission controller 110, a LAN interface 112, a network controller 114, an internal bus 116, and one or more input devices 118 (for example, a keyboard or a mouse). As shown, the system 100 may be connected to a database 120, via a link 122.

The use of an image capture unit provides a means to regularly, throughout the day, scan and monitor displays set up in retail stores. The method and system of the present disclosure may capture and store digital images of retail store conditions, for example, pictures of displays and shelf conditions of multiple retail outlets. These captured images may be stamped with date, time and location information before they are electronically sent, for example, via the Internet, to the processing location, which may be a central processor. The captured images may then be matched up to entries in a library to identify the products on display. Not only can the products be identified, but the amount of product that is packed out on a display may be approximated. Display activity may be summarized in reports and made available to the manufacturer participants or retailers, for example, in an electronic format or report format. For example, manufacturers may drill down through the reporting to see photos of the displays on which reports have been issued.

Figure 2A:
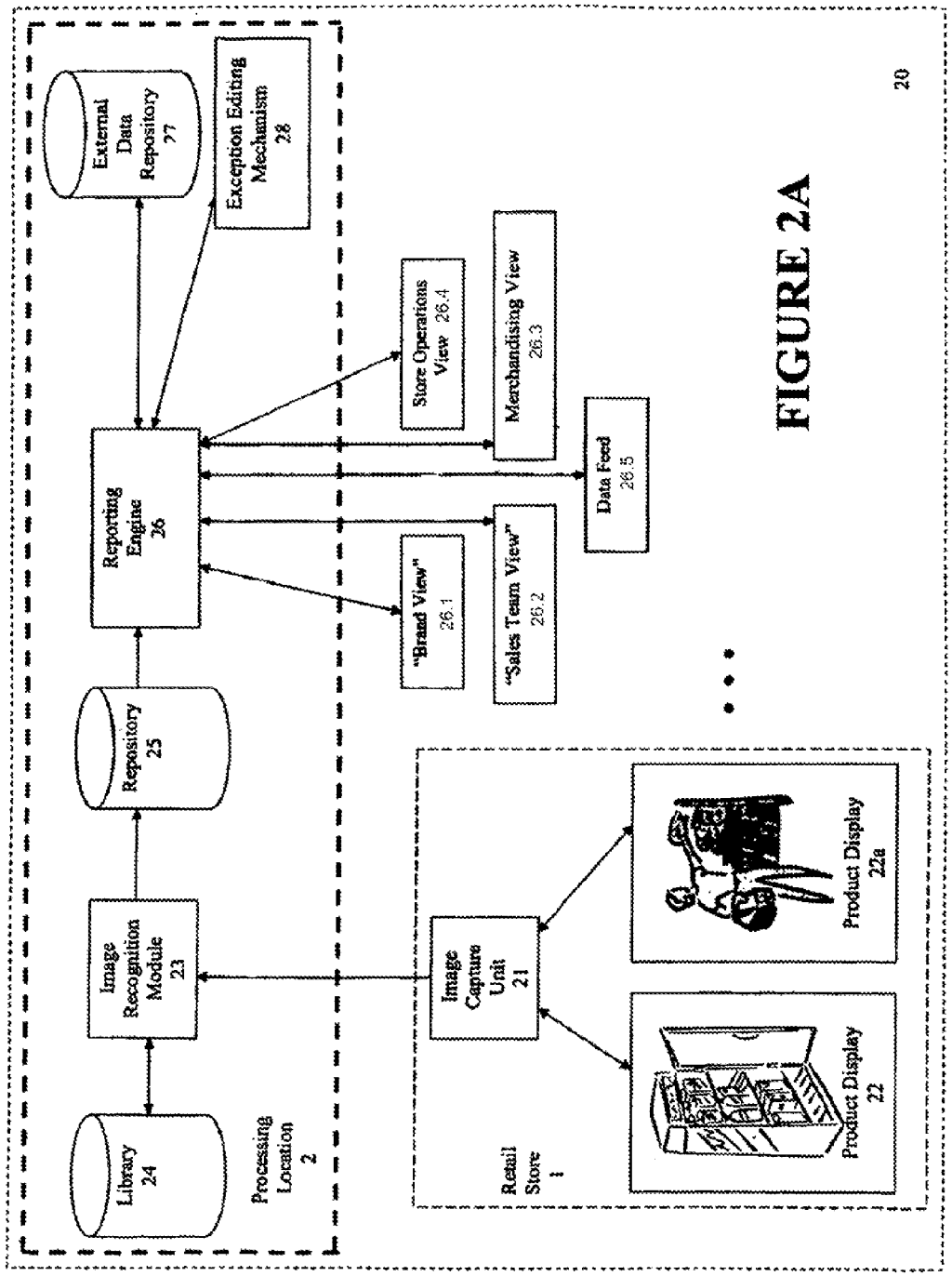
FIG. 2A is a block diagram illustrating a system for measuring retail store display compliance, according to one embodiment of the present invention.

A system for measuring retail store display compliance through automated, digital image capture and analysis, according to one embodiment of this invention, will be discussed with reference to FIG. 2A. The system 20 includes an image capture unit 21, product display 22, product display 22a, image recognition module 23, a library 24, a repository 25, and reporting engine 26. The image capture unit 21 may be used at a retail store 1 containing one or more product displays 22. The processing location 2 includes the image recognition module 23, the library 24, the repository 25, the reporting engine 26, external data repository 27 and exception editing mechanism 28. The reporting engine 26 may be used in connection with external data 27 and an exception editing mechanism 28; to generate one or more reports and/or alerts. For example, the reports may be in the form of a brand view 26.1, a sales team view 26.2, a merchandising view 26.3, a store operations view 26.4 and/or a standard electronic data feed 26.5.

A method for measuring retail store display compliance, according to one embodiment of the present invention, will be discussed below with reference to FIGS. 2A and 2B. The image capture unit 21 captures images of, for example, manufacturers' product displays 22, 22a and other retail store conditions within a retail store 1 (Step S201). The image capture unit 21 may include the following devices, which will be described in further detail below: in-store security cameras, camera phones, fixed video or other digital cameras, moving video or other digital cameras (e.g., a camera mounted in a moving track that moves from one area of the store to another), web cameras, a mobile capture unit, a mobile cart and/or a self-propelled robot. The one or more captured images are associated with related information, such as date, time and location information (Step S202) (e.g., Store Name, Store Location, Display Location, Display Type, Date and Time of Image Capture) and both the captured images and the related information are transmitted from the image capture unit 21 to a processing location 2 for storage and processing (Step S203). This can be either through hard wire or wireless connections from the image capture unit 21.

The processing location 2 receives the one or more captured images and related information and stores the one or more captured images in a repository 25 (Step S204). The image recognition module 23 processes the one or more captured images determining whether the images are of sufficient quality and whether or not they contain sufficient content (Step S205). To identify the one or more retail store conditions in the one or more captured images, the image recognition module 23 compares the one or more retail store conditions against a library 24 and matches each retail store condition with, for example, a product. The image recognition module 23 also obtains identification information about each retail store condition (Step S206). For example, the identification information may include Store Name, Store Location, Display Location, Display Type, Date and Time of Image Capture, Display Quantity, Universal Product Code ("UPC"), Brand, Description, Size, Category, etc. The one or more identified captured images and identification information are then stored in the repository 25 (Step S207).

The reporting engine 26 analyzes and compiles the information stored in the repository 25 together with other external data repository 27 (for example, sales information, inventory information) and generates a summary of the information and/or one or more alerts (Steps S208 & S209). The summary may be provided in a report format and/or an electronic data feed format into the manufacturer's or retailer's internal reporting system. For example, a raw picture feed and/or a raw data feed of one or more retail store conditions may be provided. The reporting engine 26 may also provide automated alerts when one or more retail store conditions are met or exceeded. These alerts may be sent via a telecommunications link, such as by email. For example, if only a certain number of a specific product is remaining on the shelf of a retail store, the reporting engine may generate and send an automatic email alert to, for example, the manufacturer. The reporting engine 26 can also compile information in different views for different users. For example, a brand view 26.1, sales team view 26.2, merchandising view 26.3 and/or a store operations view 26.4. Moreover, the reporting engine 26 can provide access to any captured image in any retail store at any location within the retail store for any given time.

Image Capture Unit a) Ad-Hoc Approach

According to an embodiment of the present disclosure, images may be captured by using an ad-hoc approach that may include the use of one or more of the following devices: in-store security cameras, camera phones, web cameras, fixed video or other digital cameras, and moving video or other digital cameras. For example, images of the retail store conditions, such as the displays and shelves, may be taken with digital cameras and/or camera phones and can be emailed to the processing location for storage and processing. Images taken using the ad-hoc approach may be stored in a repository 25 for ad-hoc viewing. The processing location 2 may include a web portal for uploading the images that are taken by cell phones, for example. The web portal may include a user identification and password to prevent unauthorized access, a data entry screen to capture key data for the reporting of each image, including store, location, description, etc. and the ability to upload the pictures and queue them up for processing and storage. When transmitted, these images should include related information, such as, retail store identification, text description of the picture's location in the retail store, etc. According to an embodiment of the present disclosure, prior to the transmission of the images captured using the ad-hoc image capture approach, the images should be scanned for potential computer viruses, worms, etc.

b) Mobile Capture Unit

According to another embodiment of the present disclosure, the image capture unit 21 is a mobile capture unit. The mobile capture unit may be for example, a portable unit that is easy to transport and enables users to carry it from store to store or it may be a more substantial unit in the form of, for example, a cart with wheels (similar in size to a shopping cart), that enables users to capture images by easily pushing it through the aisles in a store. For example, the mobile capture unit in the form size similar to a shopping cart may be useful in stores that do not utilize carts whereas a portable unit would be used in stores that have narrow aisles where carts may not be deployed. The mobile capture unit may be self-propelled (for example, by using electric motors) and should be chargeable and contain a backup battery supply. When not being used, the portable mobile capture unit will enter a stand-by mode. When the mobile capture unit has finished capturing images of the retail store conditions, a sound may be emitted from a speaker as a reminder to plug the unit into a power source to recharge its batteries.

The mobile capture unit may include a touch-screen PC and may be linked to and control multiple Universal Serial Bus ("USB") devices via a powered USB hub. According to an embodiment, software on the PC may control the motor speed and direction of each motor, allowing the PC to control the interface that people will use to drive the mobile capture unit through the retail store. The software may also track and record the movement of the mobile capture unit through the store. A camera trigger wheel may enable the PC to measure forward and backward movement of the mobile capture unit, for example, by counting revolutions of the wheel. For picture stitching, the PC may calculate the appropriate distance that the mobile capture unit may need to move before capturing the next image. For example, this calculation may be determined by the optimum horizontal and vertical overlap that is required for stitching pictures together to create a panoramic view from multiple images of retail store conditions. One or more USB cameras may be used with the mobile capture unit. According to an embodiment, the mobile capture unit may utilize lights to illuminate the displays in order to improve picture quality.

The mobile capture unit may unitize multiple USB infrared devices to measure and record the distance between the mobile capture unit and the displays, shelves, and/or other objects within each retail store.

According to an alternative embodiment of the present disclosure, the mobile capture unit may be a self-propelled robot that may automatically and independently roam a retail store using artificial intelligence to capture images of one or more retail store conditions. To distract the public from the real mission of the robot, the robot shell can be a marketing vehicle for the retailer. For example, the shell could be the store mascot and/or can contain video screen(s) on which advertisements can be displayed or broadcast. The screen may also be used by shoppers to ask questions such as product location, price checks, cooking recipes, etc. In addition to being able to know what areas of the store must be captured, the robot must also be able to automatically dock itself to recharge its batteries. The self-propelled robot may require an in-store navigation system, for example, a Global Positioning System ("GPS") type technology or a technology where the robot looks at its surroundings and counts the revolutions on the wheels to "learn" the store and know the locations of the aisles. The robot may use both historical picture data and X-Y coordinates to learn not only where the aisles are, but that a specific location is for example, the bread aisle or the dairy aisle. For example, both data sets may be created by the robot and then linked to the processing location 2 so that the system would learn that a specific location in the store is, for example, the bread aisle. By finding many bread items at this location in the store, over time, the robot could learn the location and boundaries of the bread section by mapping the X-Y coordinates to the UPCs it finds in the images. The product hierarchy within the library 24 allows the sections to be identified without any data entry. For example, if 90% of all the UPCs in the image are within the bread section of the library 24, then that location within the store can be coded as "Bread" until the actual data contradicts that mapping.

According to an embodiment of the present disclosure, the mobile capture unit 30 may utilize Radio Frequency Identification ("RFID") to automatically navigate the store.

Figure 3A:
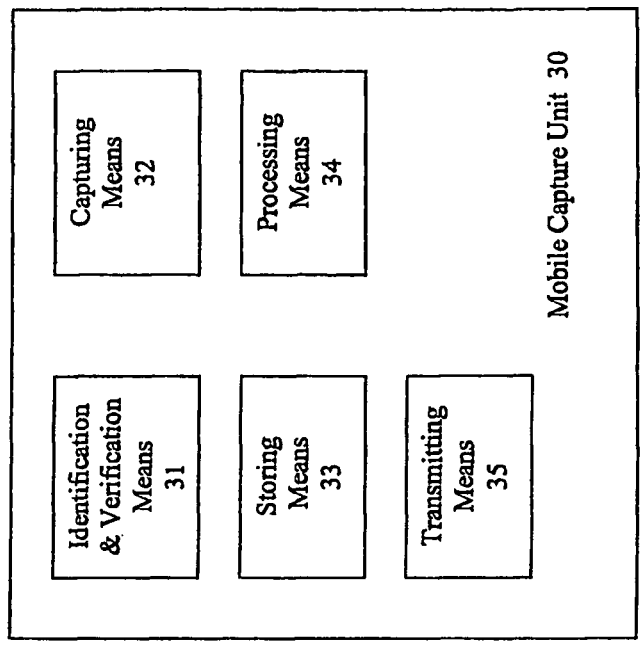
FIG. 3A is a block diagram illustrating a mobile capture unit, according to one embodiment of the present disclosure.
Figure 3B:
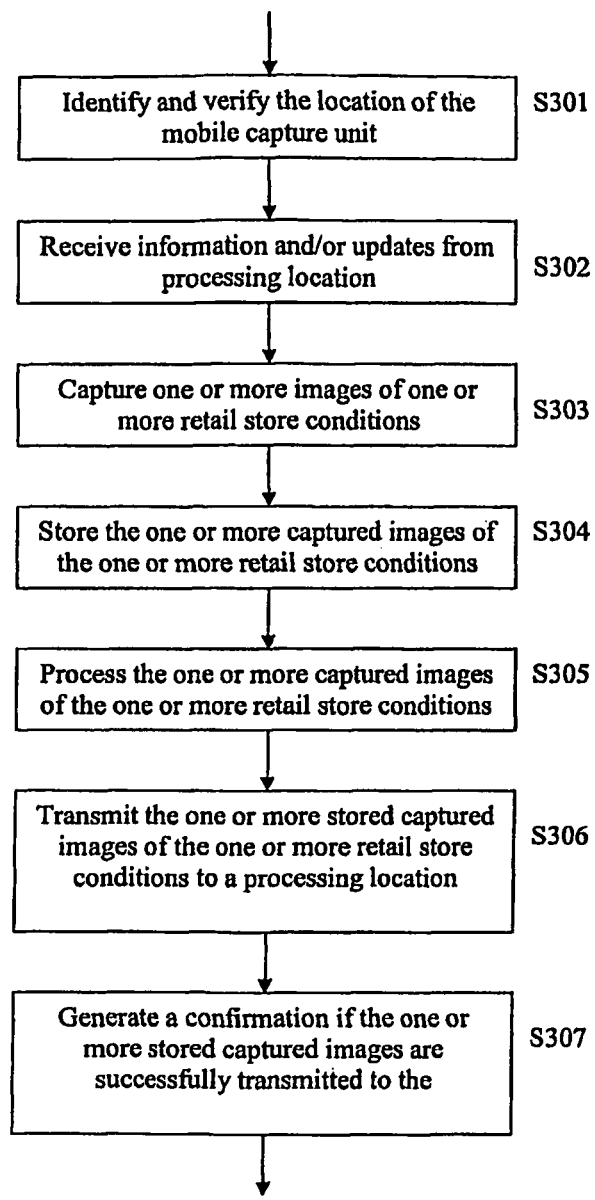
FIG. 3B is a flow chart illustrating a method for capturing one or more images, according to one embodiment of the present disclosure.

The mobile capture unit, according to an embodiment of the present disclosure, will be discussed below with reference to FIGS. 3A and 3B. The mobile capture unit 30 may include identification and verification means 31, capturing means 32, storing means 33, processing means 34 and transmitting means 35. The identification and verification means 31 identifies and verifies the location of the mobile capture unit 30 (Step S301). For example, while outside a retail store, the mobile capture unit 30 can use GPS technology to identify and confirm the retail store location. The mobile capture unit 30 may receive information and/or updates from the processing location. (Step S302). The capturing means 32 captures the one or more images of one or more retail store conditions (Step S303). The storing means 33 temporarily stores the one or more captured images of the one or more retail store conditions for a predetermined time (Step S304). The processing means 34 processes the one or more captured images of the one or more retail store conditions (Step S305). The transmitting means 35 transmits the one or more stored captured images of the one or more retail store conditions to the processing location 2 (Step S306). A confirmation may be generated indicating whether or not the one or more captured images were successfully transmitted to the processing location 2 (Step S307).

The capturing means 32 of the mobile capture unit may include one or more digital cameras, video cameras, web cameras etc. For example, multiple low-cost web cameras could be mounted in a high and/or low position on a mobile capture unit to get a flat and complete image capture of a shelf. The cameras may be positioned to take pictures at the proper angle of, for example, end-cap displays, in-aisle displays, and standard gondolas (from the floor up to eight feet in height). Fish-eye lenses may also be used to capture images of the entire display and shelf where the aisles are very narrow. The mobile capture unit 30 may also include a camera that is not fixed, for example, to the portable unit or cart. This will give flexibility to use the camera for shots that would be difficult to capture with a camera that is mounted on the cart. For example, coffin freezers, freezers with signage or frost on the doors, planogram sections with displays in front of the shelf, etc. may be problematic. According to an embodiment of the present disclosure, the mobile capture unit may utilize motion detector technology to start and stop the image capturing.

The mobile capture unit may contain means for connecting to the Internet, for example, a wireless Internet connection. The one or more captured images are transmitted to the processing location 2 in different ways depending on the availability of an Internet connection. If an Internet connection is not available in the retail stores where the unit is used, the mobile capture unit 30 may transmit the one or more captured images all together in a batch process using a high speed Internet connection. If the upload process is interrupted in the middle of transmitting the one or more captured images, the process should restart where it was interrupted. For example, if the upload process fails on the $350^{th}$ image out of 400 images, the up-load should re-start on the $351^{st}$ image. Similarly, if the connection with the processing location 2 is lost, the mobile capture unit 30 should be able to automatically re-establish a connection. According to an embodiment of the present disclosure, compression technology may be utilized with the image transfer to minimize the amount of data to be uploaded and prior to transmission, the images should be scanned for potential computer viruses, worms, etc.

However, if an Internet connection is available in the retail store, for example, if the mobile capture unit 30 is a cart stationed permanently in the store, the mobile capture unit 30 can automatically send the captured images to the processing location 2. For example, the mobile capture unit 30 can initiate the transmission of the one or more captured images to the processing location 2 or the processing location 2 can request that the mobile capture unit 30 transmit to it the one or more captured images. If the transmission process is interrupted, the system should be able to automatically recover, for example, the mobile capture unit 30 should automatically resend any images that are not usable because of transmission errors.

To minimize the risk of theft of the mobile capture unit, especially for the cart unit described above, if the mobile capture unit is taken within a certain number of feet of an exit, an audible alert can sound and/or an email alert can be transmitted to a store manager. The mobile capture unit may also request that the operator enter a user identification and/or password and may take a picture of the person pushing the cart.

According to an embodiment of the present disclosure, the mobile capture unit, for example, the cart unit can control the capturing of images to insure overlap for the virtual walk-through viewer feature, which will be further discussed below. By using the cart unit, all the pictures can be taken from the same height with enough overlap so that they could be processed in the correct sequence. For example, through web camera technology, the system could control the timing of the picture captures.

One or more auditors can follow a daily store audit schedule and visit one or more retail stores, using the mobile capture unit 30 to capture one or more images of the retail store conditions for each store. The daily store audit schedule can be transmitted from the processing location 2 to the mobile capture unit 30 and can be displayed on the mobile capture unit's 30 screen.

FIG. 4 is a block diagram illustrating the main screen of the mobile capture unit 30. Outside of a store to be audited, an auditor powers up the mobile capture unit 30 and touches or clicks "Log In/Log Out" 41 located on the main screen 40 of the mobile capture unit. The auditor can enter his username and password in order to access the system. Any changes that are made to the daily audit schedule or any other information, can be immediately transmitted and retrieved by the auditor through a message board 48. Any notes about the particular store can be accessed through "Store Notes" 44. After the auditor logs in, the mobile capture unit 40 can then verify and identify its location by using, for example, standard GPS technology and a database of retail locations. Once the mobile capture unit has identified its location, it can retrieve that retail store's floor plan configuration from the processing location 2. The floor plan configuration contains, for example, the number of aisles, freezers, fixtures, and other floor plan details. Using this information, the mobile capture unit 30 displays a floor plan 47 containing a listing of all the areas that the auditor needs to capture images of and their status 47 on its main screen 40. According to an alternate embodiment of the present disclosure, the actual graphical floor plan can be obtained and displayed. Each section may be color-coded to help the auditor quickly see what images are already captured and what images still need to be captured. According to an embodiment of the present disclosure, the areas that need to be captured will be displayed in an order that would make sense for capturing the data. For example, the first section may be near the entrance to minimize the down-time of the auditor. The suggested order/sequence on the main screen 40 may follow the typical way a person would walk through the store performing a standard store audit. At any time, the auditor can check the battery life of the mobile capture unit 30 by touching or clicking on "Check Battery" 43. After all images are captured, they may be uploaded to the processing location 2 by touching or clicking on "Up-load Pics" 45.

Figure 5:
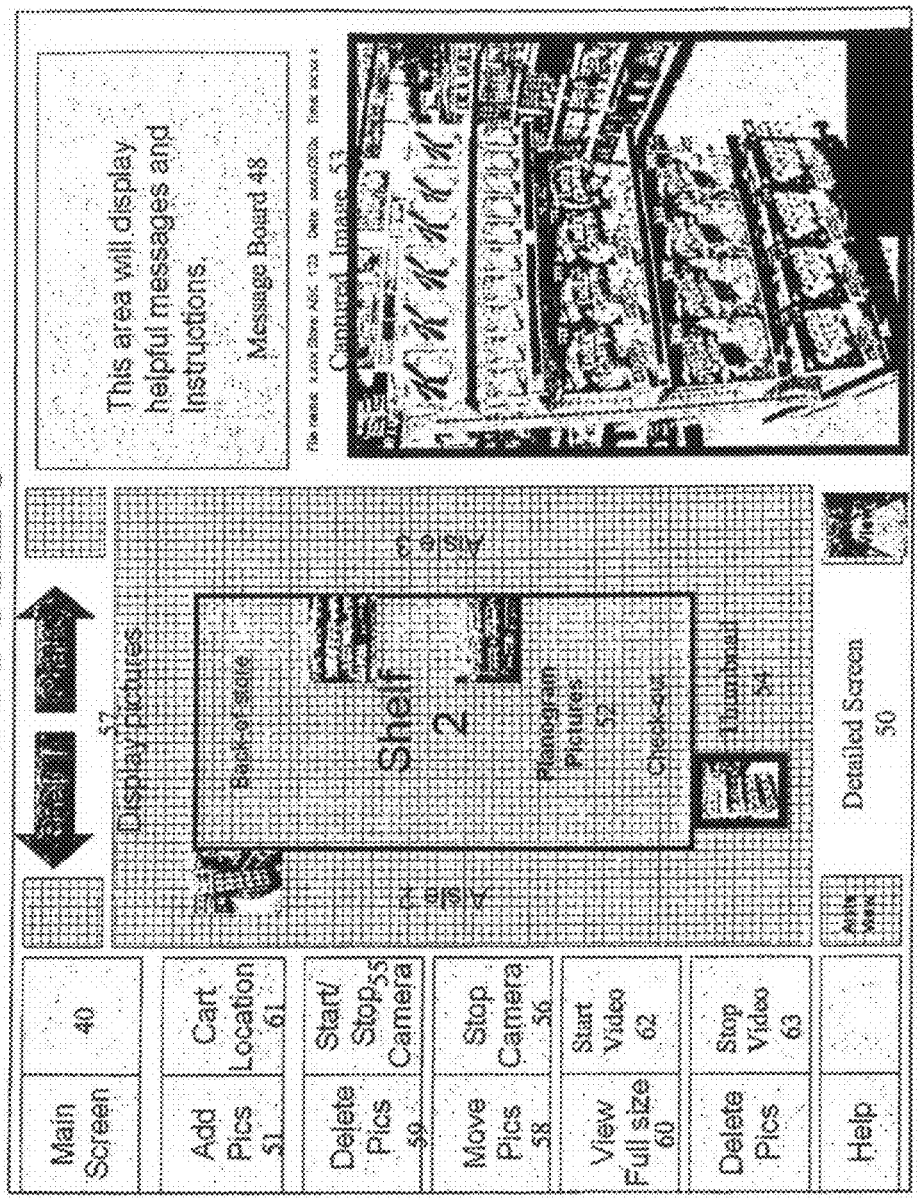
FIG. 5 is a block diagram illustrating the detailed screen of the mobile capture unit, according to one embodiment of the present disclosure.

Auditors can use the mobile capture unit 30 to audit display activity and review in-store retail conditions by using, for example, a planogram. A planogram is a diagram, drawing or other visual description of a store's layout, including placement of particular products and product categories. To capture one or more images of the retail store conditions, the auditor can touch or click any of the locations in the floor plan 47 and touch or click "Go To Detail Screen" 42, for example, if the auditor touches or clicks the fourth entry, "Aisle 2," the detailed screen 50 of FIG. 5 will be displayed. The detailed screen 50 helps the auditor capture images by using a planogram 52. The planogram 52 detailing the layout of the aisle is displayed on the detailed screen 50. By touching or clicking "Add Pics" 51, the auditor can commence the capture of images of retail store conditions. After capturing an image, the image is automatically downloaded to the storage area of the mobile capture unit 30. To add an image in its appropriate location in the planogram 52, the auditor could touch the screen at the appropriate location, causing the image to appear as a large image 53 on the right side of the screen, and as a smaller thumbnail 54 in the aisle. If the auditor puts the image in the wrong location, he/she can move the image by touching or clicking "Move Pics" 58 and touching the correct location on the screen where the image should appear. If the image is not acceptable, the auditor can delete the image by touching or clicking on "Delete Pics" 59 and retake the image. The auditor can also view the full size image by touching or clicking on "View Full Size" 60.

According to an embodiment of the present disclosure, the auditor can capture the entire length of the aisle by switching to a mobile capture unit 30 with a fixed camera, such as the cart unit described above. The cart unit may have one camera or it may have multiple cameras on two opposite sides of the unit to maximize the ability of the cart to take quality pictures of the retail store conditions as the cart is pushed down an aisle. The auditor can touch or click on "Start Camera" 55 or and touch or click the planogram 52 area in the location where the image capture would begin. The auditor can then push the mobile capture unit 30, for example, the cart unit, down the aisle, capturing the one or more images of retail store conditions in that aisle. The auditor can then touch "Stop Camera" 56 and/or the location on the planogram 52 at the end of the aisle, indicating that the image capture for that aisle is complete. The auditor can either go back to the main screen 40 by touching or clicking on "Main Screen" or can continue capturing the entire length of all the aisles by touching or clicking on the arrows 57 moving the auditor to the next or previous aisle. The arrows 57 may also move the auditor to other locations in the store, for example, the front of the store, the back of the store, the check-out area of the store, the produce area of the store, etc. Alternatively, the auditor can touch or click "Start Video" 62 and/or the location on the planogram 52 where the image capture would begin. The auditor can then push the mobile capture unit 30, for example, the cart unit, down the aisle, capturing the one or more images of retail store conditions in that aisle. The auditor can continue moving the mobile capture unit 30 up and down adjacent aisles until the image capture is completed by touching or clicking on "Stop Video" 63.

The storing means 33 temporarily stores the one or more captured images of the one or more retail store conditions for a predetermined time. For example, the images may be stored and stitched together in various ways to organize and prepare the images for the comparing or image recognition step. In addition, stitching the images together helps to eliminate duplicates that are caused by the possible overlap between sequential images of a retail store and across one or more cameras taking those images. Moreover, image stitching may also provide a raw database for a virtual walkthrough viewer feature, as well as for ad-hoc picture viewing. According to an alternate embodiment, the picture stitching could be performed after the transmission of the captured images or as the images are being captured.

The original source pictures that are stitched together to create larger pictures for the virtual-store walk through can be deleted after the new picture is created and passes quality assurance tests. If a video stream is used to capture the original source for pictures for stitching, then the video stream will be deleted as soon as the individual frames have been isolated, extracted, format converted and stitched together. The final processed images should be stored for a predetermined time in the database of the image capture unit 21. For example, images may be retained for one week and then replaced by the images of the current week. According to an embodiment of the present disclosure, each image can be stored as an individual file.

Prior to transmission, the mobile capture unit 30 may process the one or more captured images. Specifically, the mobile capture unit 30 can determine whether there are any problems with the images, such as missing sections and/or errors in picture mapping, for example, whether there was an obstacle between the mobile capture unit 30 and the shelf or display, whether the image is distorted because the mobile capture unit 30 was at a bad angle relative to the shelf or display, whether the lens is dirty or out of focus, whether the image is blurred because the mobile capture unit 30 was moving, whether there is an information gap in the image because it does not overlap with the last picture, whether the image is a duplicate of images already taken or overlaps with prior images already taken, whether there is a hardware failure of some type, making the images unusable, whether there is frost on the window of a vertical freezer or refrigerator, preventing the mobile capture unit 30 from obtaining a clear picture of the products, etc. If there are any missing images or errors, such as the ones described above, the auditor can retake those images or the mobile capture unit can automatically retake the images. Moreover, all images may be rotated to the correct orientation (for example, image may be shown on the screen and the auditor can override the rotation if it is incorrect), automatically enhanced for color, brightness, hue, etc. (for example, could be done in batch mode before the images are compressed), checked for focus (for example, image may be displayed on the screen so the auditor can decide whether or not to reject it), and/or cropping images from displays so that the product on the shelf can be correctly identified by the image recognition module 23. The operator of the mobile capture unit 30 can visually review the processed virtual-store walk through images and approve the picture quality before the next set of shelf pictures are captured, according to an embodiment of the present disclosure. For example, if the products contain a very small label the auditor can remove one of the products from the display and make the label more visible before taking the image.

The processing means may also associate the one or more captured images with related information, such as date, time and location information, including, but not limited to the following: Store Name, Store Location, Display Location, Display Type, Date and Time of Image Capture. According to an alternate embodiment, the processing performed by the image capture unit 21 may be performed after the transmission of the captured images by the processing location 2.

The captured images and related information may be transmitted to a processing location where they may be stored, further processed and converted into useful information.

Processing Location

After the one or more captured images and related information are transmitted, they are received at the processing location 2. The processing location 2, which may be centralized, includes an image recognition module 23, library 24, repository 25, reporting engine 26, external data repository 27 and exception editing mechanism 28.

Once the one or more captured images and related information are received, they are stored in a repository 25. Not all of the captured images will be permanently stored. For example, duplicates, bad images, etc. will be discarded. According to an embodiment of the present disclosure, the one or more capture images may be saved as raw images in a MS-SQL database for quick access by store, location, date, time and orientation. The one or more captured images may also be stored in a back-up location, by using, for example, data mirroring or some other form of back-up software. To minimize data storage, images should be captured and stored at a minimum resolution needed for the image recognition module. A watermark may be imposed onto each image in a way that does not degrade the picture in any way for image recognition processing. Because of the large storage requirements each day, final pictures may be archived off-line.

Figure 6:
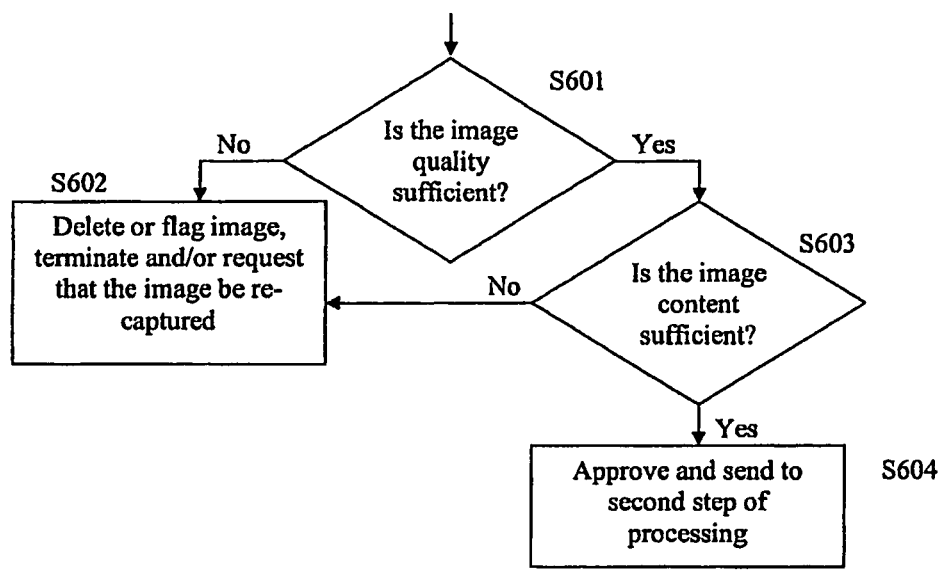
FIG. 6 is a flow chart illustrating the step of processing by the image recognition module, according to an embodiment of the present disclosure.
Figure 7:
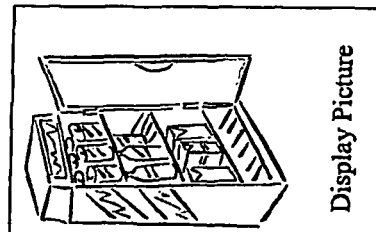
FIG. 7 is a sample report generated by using the method for measuring retail store display compliance, according to one embodiment of the present invention.

FIG. 6 is a flow chart illustrating the step of processing by the image recognition module, according to an embodiment of the present disclosure. This step may be performed by either the image capture unit 21 or the image recognition module 23. The image recognition module 23 processes the one or more captured images by determining whether the image quality and image content for each images is sufficient. For example, the image recognition module 23 can first determine if the image quality is sufficient (i.e., focusing, distortion, etc.) (Step S601). If the image recognition module 23 determines that the image quality is not sufficient (No, Step S601), it can delete or flag the image, terminate, or request that the image be re-taken (Step S602). On the other hand, if the image recognition module 23 determines that the image quality is sufficient (Yes, Step S601), the image recognition module 23 can then determine whether the overall image content is consistent with its coded location (Step S603) (i.e., if the image is coded as a shelf view, whether or not there is a display unit in the image). If the image recognition module 23 determines that there are obstacles in the image (No, Step S603) (i.e., people, shopping carts, or any other obstacle blocking the view of the shelf or display), can delete or flag the image, terminate, or request that the image be re-taken (Step S602). However, if image recognition module 23 determines that the image content is sufficient (Yes, Step S603), the image will be approved and sent to the second step of processing (Step S604). According to an embodiment, if the image recognition module 23 determines that the images contain a distant view of products on a different shelf not under analysis, the image recognition module 23 may exclude them from analysis by cropping the image to remove them. According to an alternative embodiment, the image recognition module will utilize a hand-held barcode reader in the store to identify products. The person operating the mobile capture unit 30 (for example, by pushing or driving it) will use a hand-held barcode reader to electronically record the UPC code of each product being displayed in the retail store, in addition to recording the UPC of products requiring follow-up action, such as an out-of-stock condition.

The second step of processing comprises the image recognition module 23 comparing the one or more captured images with a library 24, for example, a CPG product picture database or a third party vendor library, to identify the one or more retail store conditions in the one or more captured images and obtain identification information about the retail store conditions, for example, store number, image date/time, UPC, and/or other detailed information describing the precise location of the product in the store, etc. This allows for the creation of a database of information on the retail conditions by store, including detail on what products were found in each store and their location within the store. For example, the image recognition module 23 can compare each retail store condition in each captured image to the library 24 and identify the products that appear in each captured image (for example, by trying to identify each UPC found within the image). The processing may be split across multiple central processing units ("CPUs"), so that each CPU will complete processing prior to when the next report is due. To speed up processing time, the image recognition module 23 may only use the relevant part of the library 24 for each image. For example, if the image recognition module 23 is only analyzing displays, it can use the 5,000 UPCs or so that are typically on end-of aisle displays or if it is only analyzing images in the canned goods section, it won't analyze the frozen product images in the library 24.

The library 24 may include UPCs, shelf tags, product images, and/or any other information that would allow the image recognition module 23 to identify the one or more retail store conditions in the one or more captured images. For example, the cosmetics department may have very small products where the only major difference between the UPCs in color. Multiple passes may have to be performed on each image in order to complete the image recognition. For example, there are some categories where only a small amount of text on the product may distinguish between different UPCs. These types of UPCs could be flagged in the library. If a flagged UPC is located, the image would be processed again using different business rules. For example, if just one of these products is found a picture, additional pieces of information may be used to complete the identification process; such as the information on the shelf tag, including description, UPC bar code and related signage. For a display, information on the cardboard box and/or shipper would be used.

According to an embodiment of the present disclosure, the image recognition module 23 can find specific signage and in-store banners by comparing the one or more captured images to a third party vendor library.

After the one or more retail store conditions in each image are identified and related information obtained, this information is stored in the database 25. For example, the following information may be stored in the database for each retail store condition identified: Date of Image Capture, Time of Image Capture, Picture Identification, Store Number, User Identification, Floor Plan, Store Location, Fixture, Fixture View, Sequence Position, Processing Location Section, UPC, Quantity, Merchandising Identification, X/Y Position In Image, Date/Time Processed, Software Version, etc. For example, the Date of Image Capture relates to the date the picture was taken and the Time of Image Capture relates to the time the picture was taken, which can be converted to local time for the relevant time zone. The Picture Identification may be a file name or an identification tag assigned to the picture when it is uploaded to the processing location 2. This identification could be used in ad-hoc reporting mode to obtain the image. The Store Number is a number ID assigned to every store in the United States. A commercially available database exists, where the physical location of every retail store within the United States is identified by global latitude and longitude. This database also contains other information about each retail location, such as the retail name. This information can be used to confirm and record the physical location and retail source of the retail audit of the mobile capture unit. The User Identification relates to the identification of the auditor or operator of the image capture unit 21. The Floor Plan is a field that may be used if the software maps the store fixtures to an actual floor blueprint. One or more data fields may have to be used to identify the location in the store. The Fixture field is populated with the image where the image capture begins. The Fixture View field is populated with the image where the image capture ends. The Sequence Position relates to an internal sequence number that helps stitch pictures together into local groupings (i.e., the entire aisle). The Processing Location Section may be a calculated field by the image recognition module 23 that can estimate or calculate the section by using the UPC and the physical location. The UPC is the UPC of the product found in an image. There will be one record in the table for each UPC found in the image. The Quantity field relates to the number of UPCs that are found in the picture. For example, if the shelf has three facings of a product, then the quantity would be 3. The Merchandizing Identification is a field that may be used to identify shelf labels and in-store signage, such as shelf-talkers and banners. The X/Y Position in the image relates to the location in the image that the product was found. For example, this may be used to identify where on the shelf the product was located and whether or not this was in accordance with corporate directives. Another use of the X/Y position could be to research and troubleshoot data accuracy issues identified by the client. The Date/Time Processed is the date the image recognition module 23 processed the picture and identified the particular product in this image. The Software Version is the version of the image recognition software used by the image recognition module 23 that identified the product.

The reporting engine 26 can provide access to any captured image in any retail store at any location within the retail store for any given time. For example, through an ad-hoc image viewer, individual images may be pulled up one at a time using a filter. The filter allows the user to select search parameters, such as date range, time of day, store, products, etc. When looking at an individual image, the user can flip forward or backward in time to see what the same location looked like or will look like over time. When looking at a specific image, the user can look at the same identical location on the planogram across multiple stores. Through a virtual store walk through viewer, images of retail store conditions can be viewed sequentially in either two or three dimensions. The viewer can pull up images for one or more retail store conditions and "walk through" each image. If there are duplicate images of the same store fixture and location, the viewer can either filter out or offer a different viewing option for the duplicate images. If there are gaps in the images, the viewer may fill in the gap with standard wall-paper.

The one or more captured images and related information are analyzed and one or more summary reports and/or alerts are generated. Automated alerts and reports of in-store retail conditions may be automatically sent to clients detailing information by store, date, time and product. The alerts are configurable and table-driven, allowing the processing location 2 to easily set up business rules that will trigger the alerts. For example, if the store is past-due for sending captured images, if the store fails to display a specific product, if products not authorized for merchandising are found on the display, or any other user defined alert. Alerts may be transmitted to computers, laptops, personal digital assistants, cell phones, and any other hand-held device. Web links may be embedded within the message, so that the recipient can go directly to a supporting report or image if the device has browser support. When possible, alerts are combined so that an individual user does not receive a large amount of related emails in a short time frame.

Reports may run at summary levels that include a store, zone, chain, or any other location. The reports may report results by location within the store (i.e., end cap, aisle, etc.). For products on display, the reports may include a recap of the number of days the product was on display, the UPC, description, brand, size, etc. According to an embodiment of the present disclosure, retail point of sale data may be integrated with the retail store conditions to provide near real-time post promotion analysis. When point of sale data is integrated by the processing location 2, the reports may include information concerning one or more of the following: regular price, sale price, base volume, actual volume, lift, item UPC, brand description, size, category recap, category base, category actual, category lift, category target percent profit margin, category actual percent profit margin, participating promoted brand recap, etc.

FIGS. 7-12 show sample reports generated by using the method for measuring retail store display compliance, according to one embodiment of the present invention. For example, FIG. 8 shows a report showing display compliance by store, FIG. 9 shows a report displaying display compliance at the district level, FIG. 10 shows a report displaying display compliance at the division level, FIG. 11 shows a report displaying display compliance at a retailer level, and FIG. 12 shows a report displaying display compliance by competitive brand. Each report may be generated by using the data stored in the repository 25 and external data from one or more external data repositories 27. For example, information relating to stores may be stored in an external data repository 27 comprising a listing of all stores, including a unique retail store identifying number, name, description, address, parent company, class of trade, format and other information and attributes. Information relating to parent companies may be stored in an external data repository 27 comprising a listing of all parent companies, including a description, address and/or any other information. This allows for a roll-up of information of individual store banners to a parent company total. Information relating to UPCs may be stored in an external data repository 27 comprising a listing of all products, including UPC description, product dimensions, product images from several angles, and other attributes. Information relating to brands may be stored in an external data repository 27 comprising a listing of all brands, including description, category, manufacturer, etc. Information relating to categories and manufacturers may also be stored in the external data repository 27.

A computer storage medium, including computer executable code for measuring retail store display compliance, according to one embodiment of the present disclosure includes, code for capturing one or more images of one or more retail store conditions, code for associating the one or more captured images with related information, code for transmitting the one or more captured images and the related information to a processing location for storage and processing, code for receiving the one or more captured images and the related information at the processing location and storing the one or more captured images and related information in a repository, code for processing the one or more captured images, code for comparing the one or more retail store conditions in the one or more captured images with a library to identify the one or more retail store conditions and obtain identification information about the one or more retail store conditions, code for storing the one or more identified captured images and identification information for the one or more retail store conditions in the repository, code for analyzing the one or more retail store conditions in the one or more captured images and identification information, and code for generating one or more summary reports or one or more alerts based upon the analysis.

The code for capturing one or more images of one or more retail store conditions, according to one embodiment of the present disclosure further comprises, code for identifying and verifying the location of an apparatus, code for capturing one or more images of one or more retail store conditions, code for storing the one or more captured images of the one or more retail store conditions, code for processing the one or more captured images of the one or more retail store conditions, code for transmitting the one or more captured images of the one or more retail store conditions to a processing location, and code for generating a confirmation indicating whether the one or more captured images of the one or more retail store conditions were successfully sent to the processing location.

Numerous additional modifications and variations of the present invention are possible in view of the above-teachings.

What is claimed is:

1. A method for measuring retail store display compliance, comprising the steps of:
   moving a mobile image capture unit comprising a first computer to multiple positions within a retail store;
   capturing a plurality of still images of one or more product displays or product shelves at multiple positions within the retail store with said mobile image capture unit;
   associating the still images with related information using the first computer; and
   transmitting, by said mobile capture unit the still images and the related information to a second computer for storage and processing;
   processing the still images to optimize image quality using the second computer;
   stitching the images together to create panoramic views of retail store conditions using the first computer;
   comparing the one or more product displays or product shelves in the images with images in a library using the second computer;
   obtaining identification information about the one or more product displays or product shelves from the results of the comparison between the one or more product displays or product shelves with images in the library;
   storing said identification information for the one or more product displays or product shelves in a computer memory of the second computer;
   determining compliance of the one or more product displays or product shelves with reference to an external data repository using the second computer; and
   generating one or more summary reports or one or more alerts based upon the determination of compliance using the second computer.

2. The method of claim 1, further comprising generating a raw picture feed and/or a raw data feed of the one or more product displays or product shelves using the first computer.

3. The method of claim 1, further comprising generating automated alerts when one or more product displays or product shelves meet or exceed predetermined criteria using the second computer.

4. The method of claim 1, further comprising accessing still images captured by the mobile image capture unit using the first computer.

5. The method of claim 1, wherein the steps of capturing, associating, transmitting, processing, comparing, obtaining identification information, storing and determining are automated.

6. The method of claim 1, further comprising identifying and verifying a location of the image capture unit using an in-store navigation system.

7. The method of claim 1, wherein the step of processing further comprises determining whether the image quality and image content for the still images is sufficient.

8. The method of claim 1, wherein the related information comprises date, time, product information and location information.

9. The method of claim 1, further comprising sending one or more summary reports or alerts to a client by a telecommunications link.

10. The method of claim 1, further comprising combining multiple alerts together and sending the combined multiple alerts to a client by a telecommunications link.

11. The method of claim 1, wherein the capturing step further comprises the steps of reviewing each captured still image and approving its quality and content.

12. The method of claim 1, further comprising the step of uploading the still images via a web portal.

* * * * *

UNITED STATES PATENT AND TRADEMARK OFFICE
CERTIFICATE OF CORRECTION

PATENT NO. : 8,429,004 B2  Page 1 of 1
APPLICATION NO. : 11/887599
DATED : April 23, 2013
INVENTOR(S) : Hamilton et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1025 days.

Signed and Sealed this
Eighth Day of September, 2015

Michelle K. Lee
*Director of the United States Patent and Trademark Office*